United States Patent
Zhang et al.

(10) Patent No.: US 12,177,534 B2
(45) Date of Patent: Dec. 24, 2024

(54) METHOD, SYSTEM AND DEVICE FOR PLAYING EFFECT IN LIVE ROOM

(71) Applicant: Beijing Zitiao Network Technology Co., Ltd., Beijing (CN)

(72) Inventors: Huiqiao Zhang, Beijing (CN); Zhiwei Li, Beijing (CN); Zheng Fu, Beijing (CN); Haiyu Qiao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/393,603

(22) Filed: Dec. 21, 2023

(65) Prior Publication Data

US 2024/0129598 A1    Apr. 18, 2024

Related U.S. Application Data

(63) Continuation of application No. PCT/CN2022/125262, filed on Oct. 14, 2022.

(30) Foreign Application Priority Data

Oct. 14, 2021  (CN) .......................... 202111198430.5

(51) Int. Cl.
    *H04N 21/81*     (2011.01)
    *H04N 21/2187*   (2011.01)
    *H04N 21/234*    (2011.01)

(52) U.S. Cl.
    CPC ..... *H04N 21/8133* (2013.01); *H04N 21/2187* (2013.01); *H04N 21/23418* (2013.01)

(58) Field of Classification Search
    CPC .......... H04N 21/8133; H04N 21/2187; H04N 21/23418
    See application file for complete search history.

(56) References Cited

U.S. PATENT DOCUMENTS

| 2015/0172599 | A1  | 6/2015 | Caldwell |
| 2016/0196052 | A1* | 7/2016 | Franklin ............... G06F 3/0481 715/765 |
| 2020/0128286 | A1* | 4/2020 | Anders ............ H04N 21/23418 |

(Continued)

FOREIGN PATENT DOCUMENTS

| CN | 106604048 A | 4/2017 |
| CN | 107071580 A | 8/2017 |
| CN | 108900920 A | 11/2018 |

(Continued)

OTHER PUBLICATIONS

International Patent Application No. PCT/CN2022/125262; Int'l Search Report; dated Dec. 28, 2022; 3 pages.

(Continued)

*Primary Examiner* — Alazar Tilahun
(74) *Attorney, Agent, or Firm* — BakerHostetler

(57) ABSTRACT

Embodiments of the present disclosure relate to the technical field of computer processing, and provide an effect playback method and system for a live room, and a device. The method comprises: recognizing an article in a live room; determining a corresponding effect according to a target attribute of the article and the live room, wherein the correspondence among the article, the target attribute, and the effect is preset; and playing back the effect in the live room.

18 Claims, 3 Drawing Sheets

(56) References Cited

U.S. PATENT DOCUMENTS

2021/0400142 A1* 12/2021 Jorasch ............... H04L 65/1069
2022/0345754 A1* 10/2022 Pollock ............ H04N 21/44222

FOREIGN PATENT DOCUMENTS

| CN | 110418155 A | 11/2019 |
| --- | --- | --- |
| CN | 111541909 A | 8/2020 |
| CN | 112419143 A | 2/2021 |
| CN | 112738544 A | 4/2021 |
| CN | 112804585 A | 5/2021 |
| CN | 113448475 A | 9/2021 |

OTHER PUBLICATIONS

Chen Y., et at, "The Business Model of Live Streaming Entertainment Services in China and Associated Challenges for Key Stakeholders," IEEE Access, Aug. 2019, vol. 7, XP011742779, pp. 116321-116327.
Communication pursuant to Rules 70(2) and 70a(2) EPC for European Application No. 22880397.9, mailed Oct. 24, 2024, 1 page.
Extended European Search Report for European Application No. 22880397.9, mailed Oct. 7, 2024, 12 pages.
Written Opinion for International Application No. PCT/CN2022/125262, mailed Dec. 28, 2022, 7 Pages.

\* cited by examiner

METHOD, SYSTEM AND DEVICE FOR PLAYING EFFECT IN LIVE ROOM

CROSS-REFERENCE OF RELATED APPLICATIONS

This application is a Continuation application of International Patent Application No. PCT/CN2022/125262, filed Oct. 14, 2022, which claims priority to Chinese Application No. 202111198430.5, filed on Oct. 14, 2021, the disclosures of which are incorporated herein by reference in their entity.

FIELD

Embodiments of the present disclosure relates to the field of computer processing technology, and more specifically, to a method, a system and a device for playing an effect in a live room.

BACKGROUND

When users use the electronic devices, they usually utilize various applications of the electronic device, e.g., a live show application. Anchors may perform live shows via the anchors' terminals and audience may watch the live shows through the audience's terminals.

SUMMARY

Embodiments of the present disclosure provide a method, a system and a device for playing an effect.

In a first aspect, embodiments of the present disclosure provide a method for playing the effect in the live room, comprising: identifying an object in the live room; determining a effect based on the object and a target attribute of the live room, wherein a relationship among the object, the target attribute and the effect is preset; and playing the effect in the live room.

In a second aspect, embodiments of the present disclosure provide an apparatus for playing the effect in the live room, comprising: an object identification module configured to identify an object in the live room; a effect determination module configured to determine a effect based on the object and a target attribute of the live room, wherein a relationship among the object, the target attribute and the effect is preset; and a effect playing module configured to play the effect in the live room.

In a third aspect, one or more embodiments according to the present disclosure provide an electronic device, comprising: at least one processor and a memory; the memory storing computer-executable instructions; wherein the at least one processor executes the computer-executable instructions stored in the memory to cause the electronic device to perform the method according to the first aspect.

In a fourth aspect, one or more embodiments according to the present disclosure provide a computer-readable storage medium having computer-executable instructions stored thereon which, when executed by a processor, cause the computing device to perform the method according to the first aspect.

In a fifth aspect, one or more embodiments according to the present disclosure provide a computer program for implementing the method according to the first aspect.

In a sixth aspect, one or more embodiments according to the present disclosure provide a computer program produce comprising computer programs, which computer programs, when executed by the processor, implement the method according to the first aspect.

BRIEF DESCRIPTION OF THE DRAWINGS

Brief introduction of the drawings required in the following description of the embodiments or the prior art are to be provided below to more clearly explain the technical solutions according to the embodiments of the present disclosure or in the prior art. It is obvious that the following drawings illustrate some embodiments of the present disclosure and those skilled in the art also may obtain other drawings on the basis those illustrated ones without any exercises of inventive work.

DETAILED DESCRIPTION OF EMBODIMENTS

The technical solution in the embodiments of the present disclosure is to be described clearly and comprehensively below with reference to the drawings in the present disclosure, to better understand the objectives, technical solution and the advantages of the embodiments of the present disclosure. Apparently, the described embodiments are just a part of the embodiments of the present disclosure, rather than all of them. Based on the embodiments of the present disclosure, all other embodiments that can be obtained by those skilled in the art without any exercises of inventive work fall within the protection scope of the present disclosure.

Figure 1:
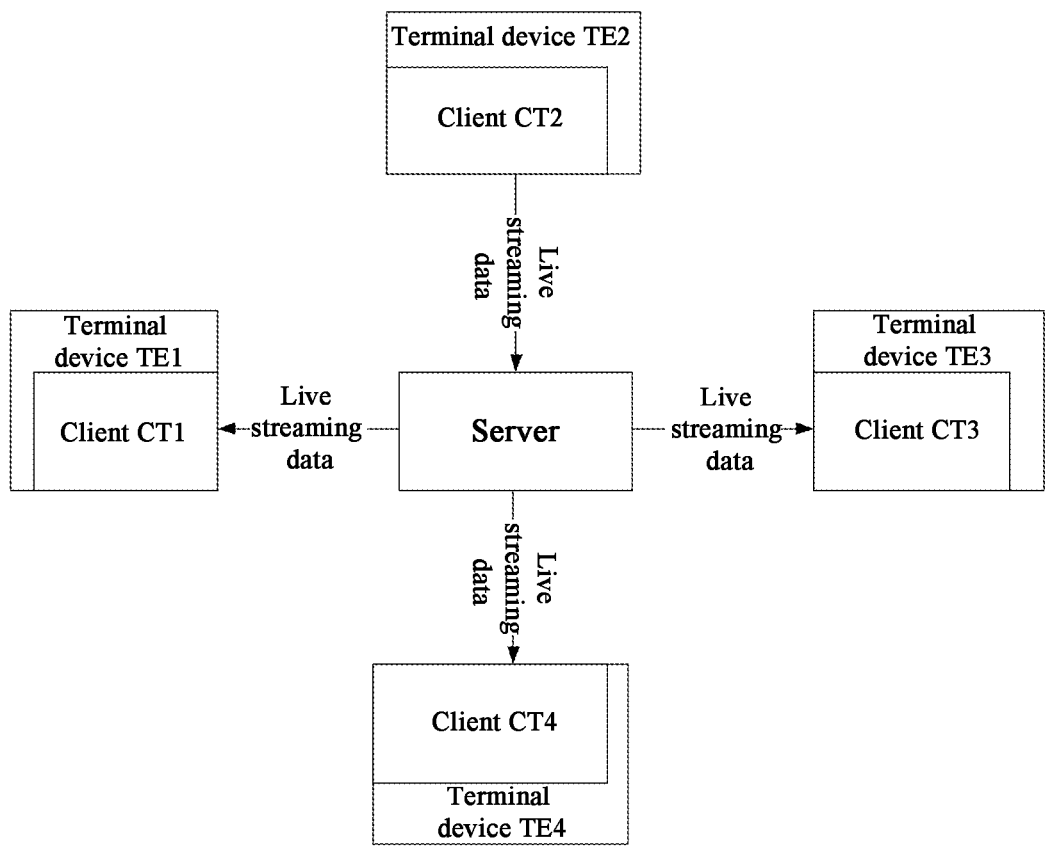
FIG. 1 illustrates a schematic diagram of a live streaming scenario in accordance with embodiments of the present disclosure.

Embodiments of the present disclosure may be applied into a live streaming scenario. FIG. 1 is a schematic diagram of a live streaming scenario in accordance with embodiments of the present disclosure. According to FIG. 1, the live streaming scenario involves a terminal device and a server, and a client operates on each terminal device for accessing the above server. FIG. 1 includes one server and four terminal devices TE1, TE2, TE3 and TE4, on which CT1, CT2, CT3 and CT4 respectively operate. CT1, CT2, CT3 and CT4 may access the server, wherein the terminal device TE2 is a terminal device used by the anchor, which is also referred to as anchor terminal. The corresponding client CT2 may also be known as anchor client. The terminal devices TE1, TE2, TE3 and TE4 each are terminal devices used by audience, which are also indicated as audience terminals. The corresponding clients CT1, CT2, CT3 and CT4 may be denoted as audience client.

When a live streaming is running on the above anchor client CT2 in a live room, the anchor terminal TE2 may forward the live streaming data of the anchor client CT2 to the server. The server may send the live streaming data to the audience terminals TE1, TE2 and TE3 that access the live room, such that the terminal devices TE1, TE2, TE3 and TE4 display the live streaming data of the live room on the corresponding audience clients CT1, CT3 and CT4.

In the above live streaming, the anchor may display an object in the live room. However, it is monotonous if the anchor only displays the object, and the live streaming is accordingly less entertaining.

To address the above problem, embodiments of the present disclosure provide a method for playing a effect in a live room, system and device. The method comprises: identifying an object in the live room; determining a effect based on the object and a target attribute of the live room, wherein a relationship among the object, the target attribute and the effect is preset; playing the effect in the live room. Embodiments of the present disclosure may play a corresponding effect in the live room in accordance with the object in the live room. As such, the object may be combined with the effect to provide more ways for displaying objects in the live streaming. Therefore, the interactive effect of the live streaming is improved and the user experience is enhanced.

The technical solution according to embodiments of the present disclosure and how such technical solution addresses the above technical problem are to be explained in details below with reference to specific embodiments. The following several specific embodiments may be combined with each other and same or similar concepts or procedures may not be repeated in certain embodiments. Embodiments of the present disclosure are to be described below with reference to the drawings.

Figure 2:
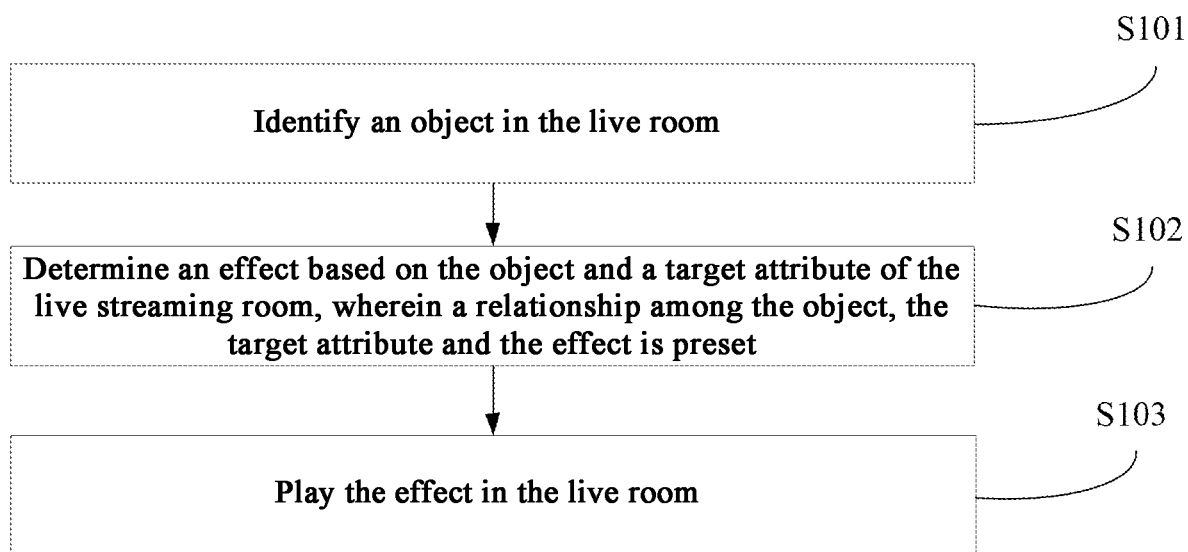
FIG. 2 illustrates a flowchart of a method for playing a effect in a live room in accordance with embodiments of the present disclosure.

FIG. 2 is a flowchart of a method for playing a effect in a live room in accordance with embodiments of the present disclosure. The method shown in FIG. 2 may be applied into an electronic device, e.g., any terminal device in the above FIG. 1 including anchor terminal and audience terminal. According to FIG. 2, the method for playing a effect in the live room comprises:

S101: identifying an object in the live room.

Wherein the object in the live room may be any object, such as trophy and medal etc.

Embodiments of the present disclosure may provide a plurality of approaches for identifying the object. In the embodiments of the present disclosure, the object in the live room may be identified according to a specified time period, e.g., identifying once every N milliseconds. The object in the live room, for example, may be a real object filmed by the anchor during the live streaming or an object displayed by the anchor etc.

S102: determining a effect based on the object and a target attribute of the live room, wherein a relationship among the object, the target attribute and the effect is preset.

Wherein the target attribute may include, but not limited to: an anchor attribute of the live room and a room attribute of the live room.

The above anchor attribute of the live room comprises at least one of: an identification of the anchor, a name of the anchor, and a type of the anchor. The identification of the anchor may be an account of the anchor of the live room, the account uniquely representing one anchor. The type of the anchor may be obtained from classification in any dimensions. For example, according to the content of the live streaming which the anchor is good at, the anchor is classified into match commentary anchor and sales anchor.

The above room attribute of the live room comprises at least one of: an identification of the live room, a name of the live room and a type of the live room. The type of the live room may be obtained from classification in any dimensions. For example, the live room may be classified into live room for sales of products and live room for match commentary according to the purpose. The live room may also be classified according to the length of the live room.

In the embodiments of the present disclosure, after the object in the live room is identified, the target attribute of the live room may be obtained. Accordingly, the playing of the effect is determined in accordance with whether the target attribute and the effect is obtained.

In a first case, the target attribute is not obtained. Since the target attribute required by the effect is not determined, the effect will not be played.

In a second case, the target attribute is obtained. However, the corresponding effect is not obtained according to the object and the target attribute. The effect is not played because it is not obtained yet.

In a third case, the target attribute is obtained, and the corresponding effect is also acquired according to the object and the target attribute. Therefore, the effect is played.

In the embodiments of the present disclosure, a plurality of corresponding relationships used in S102 may be preconfigured. Object, and/or target attribute, and/or effect may vary in different corresponding relationships.

It is to be explained that one object may correspond to a plurality of target attributes, each target attribute corresponding to a effect. For example, when the target attribute is the identification of the anchor, there are three corresponding relationships: {M1, ID1, SE1}, {M1, ID2, SE2} and {M1, ID3, SE1}. Accordingly, in the live room having the anchor identification of ID1, the effect corresponding to the object M1 is SE1; in the live room having the anchor identification of ID2, the effect corresponding to the object M1 is SE2; and in the live room having the anchor identification of ID3, the effect corresponding to the object M1 is SE1.

As can be seen, the object M1 has corresponding effects in respective three live rooms. The effect corresponding to M1 in the live room of the anchor ID1 is different from the effect corresponding to M1 in the live room of the anchor ID2. However, the corresponding effect in the live room of the anchor ID1 is the same as the corresponding effect in the live room of the anchor ID3.

In summary, effects of the same object may be played in live rooms of a plurality of anchors. Besides, the effects may be the same or different in various live rooms. As such, the effect also corresponds to the target attribute in addition to the object. In case of a different object and a distinct target attribute, the displayed effect may vary. Therefore, the effects become more flexible.

Besides, one target attribute may correspond to one or more objects, and the effects corresponding to different objects may be the same or different. For example, when the target attribute is the anchor identification, there are three corresponding relationships: {M1, ID1, SE1}, {M2, ID1, SE2} and {M3, ID1, SE1}. Thus, the three objects M1 to M3 all have effects in the live room of the anchor ID1. However, M1 and M2 correspond to different effects while M1 and M3 correspond to the same effect SE1.

At last, one target attribute and one object also may correspond to two effects. For example, when the target attribute is the anchor identification, there are two corresponding relationships: {M1, ID1, SE1 and {M1, ID1, SE2}. Accordingly, in the live room having the anchor identification of ID1, the object M1 may correspond two effects SE1 and SE2. In other words, both the effects SE1 and SE2 are played for the object M1. For example, in the live room having the anchor identification of ID1, when the object M1 shown by the anchor is a trophy, an audio effect SE1 and a video effect SE2 are played.

After the above one or more corresponding relationships are obtained, a target corresponding relationship that match both the object identified in S101 and the target attribute corresponding to the live room in S101 is selected from the one or more corresponding relationships, and a effect in the target corresponding relationship acts as the effect to be played in S103.

It is to be appreciated that the target corresponding relationship comprises a corresponding relationship between the object identified in S101 and the target attribute corresponding to the live room in S101.

S103: playing the effect in the live room.

Wherein the effect may include, but not limited to, image effect, video effect and audio effect.

The above image effect is a effect represented by images, and may be a frame of image having specific content. For example, when the object is a trophy, the corresponding image effect may be a trophy image with the anchor profile.

The above video effect is a effect represented by continuous frames of images, and each frame of image may include specific content. For example, when the object is a trophy, the corresponding video effect may be a GIF of the trophy with the anchor profile.

The above audio effect is a effect represented by sounds. For instance, when the object is a trophy, the corresponding audio effect may be a voice saying "Wow, the winner of the Gold Award".

To accurately play the effects in accordance with the object in the live room, the effect may be played when a predetermined condition is satisfied. The predetermined condition may include, but not limited to: a number of times the effect was played being smaller than or equal to a preset threshold; current time being within a valid time interval; a state of the object being a target object state; an anchor state being a target anchor state. Specifically, when one or more of the above predetermined conditions are satisfied, the effect is played in the above live room. In case that one or more of the above predetermined conditions are not satisfied, the effect is not played in the above live room.

A relationship between each predetermined condition and the play of the effect is described below.

When the predetermined condition is set as a number of times the effect was played being smaller than or equal to a preset threshold, a number of times the effect was played in the above live room during a predetermined time period may be obtained in the first place. Then, a relationship between a number of times the effect was played and the preset threshold is determined. If a number of times the effect was played is smaller than or equal to the preset threshold, the effect is played in the live room; if a number of times the effect was played is greater than the preset threshold, the effect is not played in the live room.

Wherein the predetermined time period may be days and hours etc. An example in which the predetermined time period is hours and the preset threshold is 1 is provided below to explain the play situation of the effect.

At 10:05, an object in the live room is detected through S101. At this moment, the effect determined in S102 was not played in the live room from 10 to 11 o'clock, i.e., the number of times the effect was played is smaller than the preset threshold of 1. In such case, the effect may be played, and the number of times the above effect was played in the live room is thus updated to 1 from 0.

At 10:10, the object is detected again through S101. At this moment, the effect determined in the above S102 was played once in the live room between 10 to 11 o'clock, i.e., the number of times the effect was played is equal to the preset threshold of 1. In such case, the effect may be played, and the number of times the above effect was played in the live room is consequently updated to 2 from 1.

At 10:15, the object is detected again through S101. At this moment, the effect determined in the above S102 was played twice in the live room between 10 to 11 o'clock, i.e., the number of times the effect was played is greater than the preset threshold of 1. In such case, the effect is not played, and the number of times the above effect was played in the live room is not updated.

Likewise, the effect of the object is no longer displayed in the live room between 10:15 and 11:00.

Therefore, due to the above predetermined condition consisting of the number of times the above effect was played and the predetermined threshold, the object will not be displayed for an excessive long time in the live streaming and the effect of the object will not be repeatedly displayed. The live streaming may go smoothly in the live room without being affected by the effect of the object.

In case that the predetermined condition is set as current time being within a valid time interval, after the object is identified in S101 and the effect is determined from S102, a relationship between the current time and the valid time interval of the effect may be determined. If the current time is within the valid time interval, the effect determined in S102 is played in the above live room of S101. If the current time is outside the valid time interval, the effect determined in S102 is not played in the above live room of S101.

Wherein the valid time interval may be preset and indicates a time interval during which the effect is enabled to be played in a live room with the target attribute.

The above valid time interval may associate with the corresponding relationship in S102. Specifically, each corresponding relationship in S102 corresponds to one valid time interval. As such, the valid time interval of the same object may be the same or different in the live rooms of various anchors. For example, the object identified in S101 is a trophy in 2015, and a valid time interval for the trophy is set to be from 2015 to 2017. Accordingly, since 2018, the effect of the trophy is no longer displayed in the live room even if the trophy is detected in the live room of the anchor.

Thus, in the embodiments of the present disclosure, the play duration of the effect is limited by the above valid time interval, and the valid time interval may be a period of time during which the object has a great influence. For example, in terms of the trophy, it may attract less attention years later, indicating a weak influence. Accordingly, the valid time interval may be to be a period of time following the presentation of the trophy.

When the predetermined condition is set as a state of the object being a target object state, the state of the object is identified in the live room. Then, it is determined whether the state of the object is the target object state. If the state of the object is the target object state, the effect is played in the live room; if not, the effect is not played in the live room.

Wherein the target object state may include at least one of: being at a handheld state, or being located at a target position.

The above handheld state indicates that the object is held in the hands of people. That is, if the object is held in the hands of people, it indicates that the anchor is displaying the object and the effect of the object may be played. Otherwise, if the object is not held in the hands of people, the effect of the object is not played.

The above target position may be a preset display position of the object. For example, the target position may be in front of the anchor. In other words, if the object is in the front of the anchor, it indicates that the anchor is displaying the object and the effect of the object may be played. Otherwise, if the object is not in front of the anchor, the effect of the object is not played.

Embodiments of the present disclosure may determine the object being displayed by the anchor based on the state of the object, to ensure that the effect is played while the anchor is displaying the object. In case that the state of the object is not the target object state, it is considered that the anchor is not displaying the object and the effect will not be played. In this way, embodiments of the present disclosure may ensure that the effect is played at right time and avoid playing the effect at wrong time.

When the predetermined condition is set as an anchor state being a target anchor state, the state of the anchor in the live room is first identified. Then, it is determined whether the anchor state is the target anchor state. If yes, the effect is played in the live room; if not, the effect is not played in the live room.

Wherein the target anchor state comprises at least one of: a gesture of the anchor being directed to the object, or a relative positional relationship between the anchor and the object being a target position relationship.

The above gesture of the anchor directed to the object may indicate that the anchor is displaying the object. For example, when displaying the object, the anchor usually points at the object with fingers.

The above target relative positional relationship may be a relative positional relationship between any limb of the anchor and the object. For example, the relative positional relationships in which the anchor faces the object, or stares at the object or the body of the anchor is oriented towards the object may serve as the target position relationship, which indicates that the anchor is displaying the object.

Embodiments of the present disclosure may determine that the anchor is displaying the object through the state of the anchor. Therefore, it is ensured that the effect is played when the anchor is displaying the object. In this way, embodiments of the present disclosure may ensure that the effect is played at right time and avoid playing the effect at wrong time.

When the predetermined condition is set as a duration of the presence of the object being smaller than or equal to a preset duration threshold, the duration of the object present in the live room is first determined and a relationship between the presence duration and the preset duration threshold is then determined. If the duration of the presence of the object is smaller than or equal to the preset duration threshold, the effect is played in the live room; if the duration of the presence of the object is greater than the preset duration threshold, the effect is not played in the live room.

Wherein the preset duration threshold may be a small value to avoid influences over the live streaming caused by excessive long play time of the effect. For example, the preset duration threshold may be set to 10 seconds. In such case, the effect is played at the initial 10 seconds when the object is displayed in the live room. After the 10 seconds, the effect is no longer played even if the object is still displayed in the live room.

When a plurality of predetermined conditions is set, the effect is played only when a plurality of predetermined conditions is satisfied simultaneously. The effect is not played if any one of the predetermined conditions is not satisfied. For example, in case that the predetermined condition is set to include: a number of times the effect was played being smaller than or equal to a preset threshold; current time being within a valid time interval; a state of the object being a target object state; and an anchor state being a target anchor state, the effect is played on the condition that the number of times the effect was played is smaller than or equal to a preset threshold, the current time is within a valid time interval, the state of the object is the target object state, and the anchor state is the target anchor state. However, the effect is not played if the number of times the effect was played is greater than the preset threshold, and/or the current time is outside a valid time interval, and/or the state of the object is not the target object state, and/or the anchor state is not the target anchor state.

It is to be explained that when the above effect is image effect or video effect, the image effect or the video effect may be played in accordance with the position of the object in the live room. Specifically, the effect is played around the object in the live room. Accordingly, the relationship between the effect and the object becomes clearer. For example, the image effect or the video effect may be played at the left side, right side, upper side and lower side of the trophy.

It should be appreciated that the live streaming usually lasts a long time and the anchor may display different objects at various times during the live streaming. In such case, the effects corresponding to the respective objects may be played one by one in time order. For example, the anchor displays the object M1 at t1, and the effect of the object M1 may be displayed at t1. The anchor also displays the object M2 at t2, and the effect of the object M2 may be displayed at t2. It is certain that the effect of M1 may be the same as or different from the effect of M2.

Figure 3:
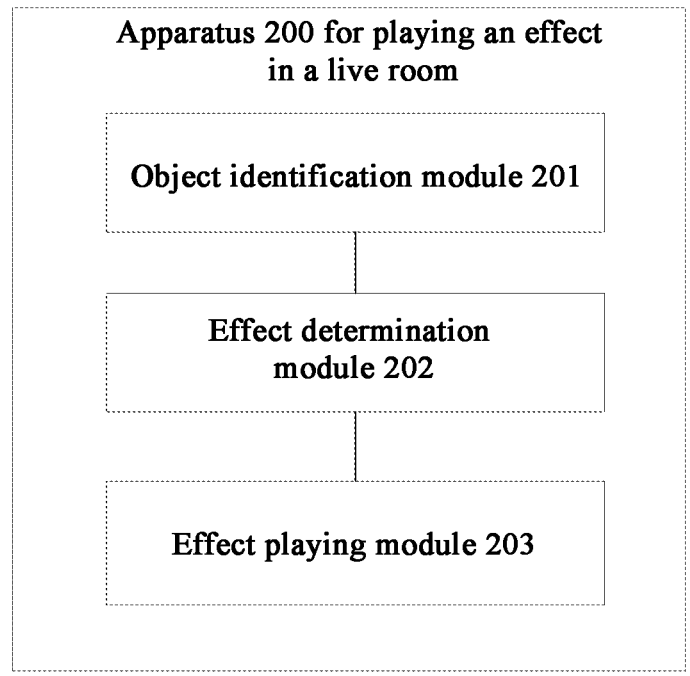
FIG. 3 illustrates a structural diagram of an apparatus for playing a effect in a live room in accordance with embodiments of the present disclosure.

FIG. 3 is a structural diagram of an apparatus for playing a effect in the live room provided by the embodiments of the present disclosure. The apparatus corresponds to the method for playing a effect in the live room according to the above embodiment and is applied into a system for playing a effect in the live room. To facilitate the description, only the part associated with the embodiments of the present disclosure is demonstrated. With reference to FIG. 3, the above apparatus 200 for playing a effect in the live room comprises: an object identification module 201, a effect determination module 202 and a effect playing module 203.

Wherein the object identification module 201 is configured to identify the object in the live room.

The effect determination module 202 is configured to determine a effect based on the object and the target attribute of the live room, wherein a relationship among the object, the target attribute and the effect is preset.

The effect playing module 203 is configured to play the effect in the live room.

Optionally, the target attribute comprises at least one of: an anchor attribute of the live room and a room attribute of the live room.

Optionally, the anchor attribute comprises at least one of: an identification of the anchor, a name of the anchor, and a type of the anchor.

Optionally, the room attribute of the live room comprises at least one of: an identification of the live room, a name of the live room and a type of the live room.

Optionally, the effect playing module 203 is also configured to play the effect in the live room in case that a predetermined condition is satisfied, wherein the predetermined condition comprises at least one of: a number of times the effect was played in the live room during a predetermined time period being smaller than or equal to a preset threshold; current time being within a valid time interval of the effect, wherein the valid time interval indicates a time interval during which the effect is enabled to be played in a live room with the target attribute; a state of the object in the live room being a target object state; an anchor state of the live room being a target anchor state; or a duration of the object present in the live room being smaller than or equal to a preset duration threshold.

Optionally, the target object state comprises at least one of: being at a handheld state, or being located at a target position.

Optionally, the target anchor state comprises at least one of: a gesture of the anchor being directed to the object, or a relative positional relationship between the anchor and the object being a target position relationship.

Optionally, the effect comprises at least one of: an image effect; a video effect; or an audio effect.

Optionally, in case that the effect is an image effect or a video effect, the effect playing module 203 also configured to: play the effect around the object in the live room.

The apparatus for playing the effect in the live room may be used to perform the above technical solution according to the method embodiment shown by FIG. 2. The implementation principle and the technical effect of the apparatus are similar to those for the method and will not be repeated in this embodiment.

Figure 4:
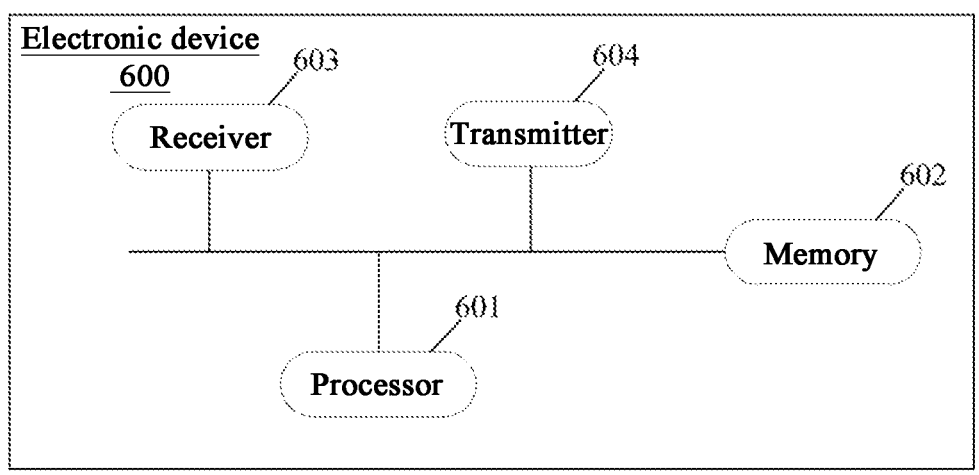
FIGS. 4 and 5 illustrate structural diagrams of two electronic devices provided by the embodiments of the present disclosure.

FIG. 4 is a structural diagram of an electronic device 600 in accordance with embodiments of the present disclosure. The electronic device 600 comprises a memory 602 and at least one processor 601.

Wherein the memory 602 stores computer-executable instructions.

The at least one processor 601 executes the computer-executable instructions stored in the memory 602 to cause the electronic device 600 to perform the above method in FIG. 2

In addition, the electronic device also may include a receiver 603 and a transmitter 604, wherein the receiver 604 is configured to receive information from other apparatuses or devices and forward the information to the processor 601, and the transmitter 604 transmits the information to other apparatuses or devices.

Figure 5:
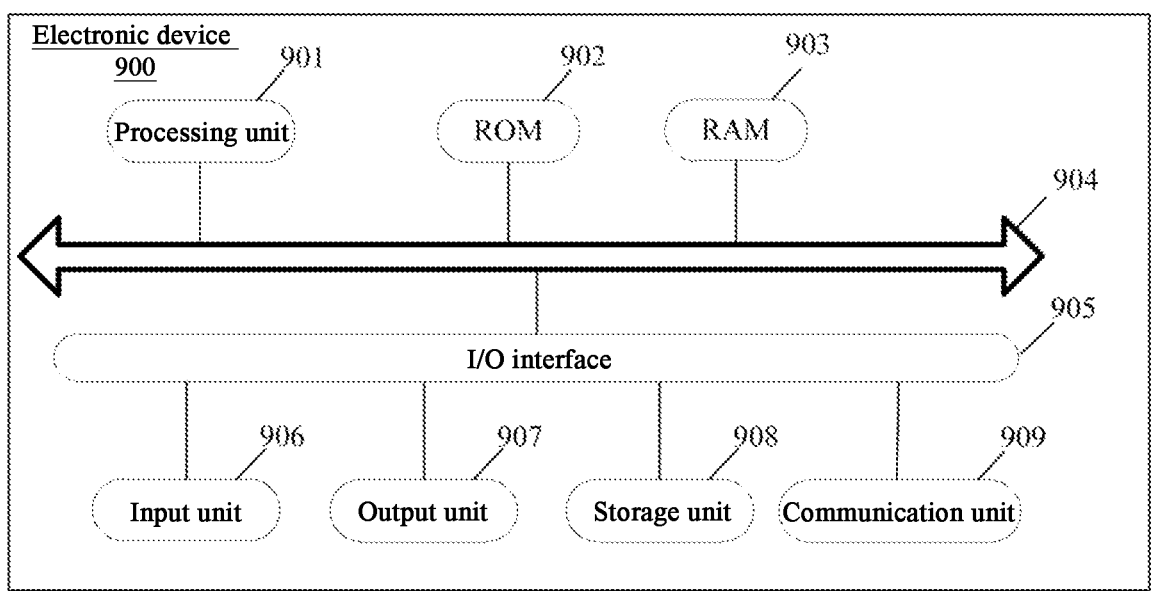

Furthermore, FIG. 5 illustrates a structural diagram of an electronic device 900 adapted to implement the embodiments of the present disclosure. The electronic device 900 may be a terminal device, wherein the terminal device may include, but not limited to, mobile terminals, such as mobile phones, notebooks, digital streaming receivers, Personal Digital Assistant (PDA), Portable Android Device (PAD), Portable Multimedia Player (PMP) and vehicle terminals (such as car navigation terminal) and fixed terminals, e.g., digital TVs and desktop computers etc. The electronic device shown in FIG. 5 is only an example and does not limit the functions and application ranges of the embodiments of the present disclosure.

According to FIG. 5, the electronic device 900 may include a processing unit (e.g., central processor, graphic processor and the like) 901, which can execute various suitable actions and processing based on the programs stored in the read-only memory (ROM) 902 or programs loaded in the random-access memory (RAM) 903 from a storage unit 908. The RAM 903 can also store all kinds of programs and data required by the operations of the electronic device 900. Processing unit 901, ROM 902 and RAM 903 are connected to each other via a bus 904. The input/output (I/O) interface 905 is also connected to the bus 604.

Usually, input unit 906 (including touch screen, touchpad, keyboard, mouse, camera, microphone, accelerometer, gyroscope and like) and output unit 907 (including liquid crystal display (LCD), speaker and vibrator etc.), storage unit 908 (including tape and hard disk etc.) and communication unit 909 may be connected to the I/O interface 905. The communication unit 909 may allow the electronic device 900 to exchange data with other devices through wired or wireless communications. Although FIG. 5 illustrates the electronic device 900 having various units, it is to be understood that it is not a prerequisite to implement or provide all illustrated units. Alternatively, more or less units may be implemented or provided.

In particular, in accordance with embodiments of the present disclosure, the process depicted above with reference to the flowchart may be implemented as computer software programs. For example, the embodiments of the present disclosure include a computer program product including computer programs carried on a computer readable medium, wherein the computer programs include program codes for executing the method demonstrated by the flowchart. In these embodiments, the computer programs may be loaded and installed from networks via the communication unit 909, or installed from the storage unit 908, or installed from the ROM 902. The computer programs, when executed by the processing unit 901, performs the above functions defined in the method according to the embodiments of the present disclosure.

It is to be explained the above disclosed computer readable medium may be computer readable signal medium or computer readable storage medium or any combinations thereof. The computer readable storage medium for example may include, but not limited to, electric, magnetic, optical, electromagnetic, infrared or semiconductor systems, apparatus or devices or any combinations thereof. Specific examples of the computer readable storage medium may include, but not limited to, electrical connection having one or more wires, portable computer disk, hard disk, random access memory (RAM), read-only memory (ROM), erasable programmable read only memory (EPROM or flash memory), fiber optics, portable compact disk read only memory (CD-ROM), optical storage device, magnetic storage device, or any suitable combinations thereof. In the present disclosure, the computer readable storage medium may be any tangible medium that contains or stores programs. The programs may be utilized by instruction execution systems, apparatuses or devices in combination with the same. In the present disclosure, the computer readable signal medium may include a data signal propagated in baseband or as part of a carrier wave, carrying computer readable program codes therein. Such propagated data signals may take many forms, including but not limited to, electromagnetic signals, optical signals, or any suitable combinations thereof. The computer readable signal medium may also be any computer readable medium in addition to the computer readable storage medium. The computer readable signal medium may send, propagate, or transmit programs for use by or in connection with instruction execution systems, apparatuses or devices. Program codes contained on the computer readable medium may be transmitted by any suitable media, including but not limited to: electric wires, fiber optic cables and RF (radio frequency) etc., or any suitable combinations thereof.

The above computer readable medium may be included in the aforementioned electronic device or stand-alone without fitting into the electronic device.

The above computer-readable medium carriers one or more programs, where the one or more programs, when executed by the electronic device, cause the electronic device to perform the method shown by the above embodiments.

Computer program instructions for executing operations of the present disclosure are written in one or more programming languages or combinations thereof. The above programming languages include object-oriented programming languages, e.g., Java, Smalltalk, C++ and so on, and traditional procedural programming languages, such as "C" language or similar programming languages. The program codes can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider).

The flow chart and block diagram in the drawings illustrate system architecture, functions and operations that may be implemented by system, method and computer program product according to various implementations of the present disclosure. In this regard, each block in the flow chart or block diagram can represent a module, a part of program segment or code, wherein the module and the part of program segment or code include one or more executable instruction for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Units described in the embodiments of the present disclosure may be implemented by software or hardware. In some cases, the name of the unit should not be considered as the restriction over the unit per se. For example, the first obtaining unit also may be described as "a unit that obtains at least two internet protocol addresses".

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In a first example of the first aspect, embodiments of the present disclosure provide a method for playing a effect in the live room, the method comprising: identifying an object in the live room; determining a effect based on the object and a target attribute of the live room, wherein a relationship among the object, the target attribute and the effect is preset; and playing the effect in the live room.

Based on the first example of the first aspect, in a second example of the first aspect, the target attribute comprises at least one of: an anchor attribute of the live room and a room attribute of the live room.

Based on the second example of the first aspect, in a third example of the first aspect, the anchor attribute comprises at least one of: an identification of the anchor, a name of the anchor, and a type of the anchor.

Based on the second example of the first aspect, in a fourth example of the first aspect, the room attribute of the live room comprises at least one of: an identification of the live room, a name of the live room and a type of the live room.

Based on any of the first to fourth examples of the first aspect, in a fifth example of the first aspect, the playing the effect in the live room comprises: playing the effect in the live room in case that a predetermined condition is satisfied, wherein the predetermined condition comprises at least one of: a number of times the effect was played in the live room during a predetermined time period being smaller than or equal to a preset threshold; current time being within a valid time interval of the effect, wherein the valid time interval indicates a time interval during which the effect is enabled to be played in a live room with the target attribute; a state of the object in the live room being a target object state; an anchor state of the live room being a target anchor state; or a duration of the object present in the live room being smaller than or equal to a preset duration threshold.

Based on the fifth example of the first aspect, in a sixth example of the first aspect, the target object state comprises at least one of: being at a handheld state, or being located at a target position.

Based on the fifth example of the first aspect, in a seventh example of the first aspect, the target anchor state comprises at least one of: a gesture of the anchor being directed to the object, or a relative positional relationship between the anchor and the object being a target position relationship.

Based on any of the first to fourth examples of the first aspect, in an eighth example of the first aspect, the effect comprises at least one of: an image effect; a video effect; or an audio effect.

Based on the eighth example of the first aspect, in a ninth example of the first aspect, playing the effects in the live room comprises, in case that the effect is an image effect or a video effect: playing the effect around the object in the live room.

In a first example of the second aspect, there is provided an apparatus for playing a effect in the live room, the apparatus comprising: an object identification module configured to identify an object in the live room; a effect determination module configured to determine a effect based on the object and a target attribute of the live room, wherein a relationship among the object, the target attribute and the effect is preset; and a effect playing module configured to play the effect in the live room.

Based on the first example of the second aspect, in a second example of the second aspect, the target attribute comprises at least one of: an anchor attribute of the live room and a room attribute of the live room.

Based on the second example of the second aspect, in a third example of the second aspect, the anchor attribute comprises at least one of: an identification of the anchor, a name of the anchor, and a type of the anchor.

Based on the second example of the second aspect, in a fourth example of the second aspect, the room attribute of the live room comprises at least one of: an identification of the live room, a name of the live room and a type of the live room.

Based on any of the first to fourth examples of the second aspect, in a fifth example of the second aspect, the playing the effect in the live room comprises: playing the effect in the live room in case that a predetermined condition is satisfied, wherein the predetermined condition comprises at least one of: a number of times the effect was played in the live room during a predetermined time period being smaller than or equal to a preset threshold; current time being within a valid time interval of the effect, wherein the valid time interval indicates a time interval during which the effect is enabled to be played in a live room with the target attribute; a state of the object in the live room being a target object state; an anchor state of the live room being a target anchor state; or a duration of the object present in the live room being smaller than or equal to a preset duration threshold.

Based on the fifth example of second first aspect, in a sixth example of the second aspect, the target object state comprises at least one of: being at a handheld state, or being located at a target position.

Based on the fifth example of the second aspect, in a seventh example of the second aspect, the target anchor state comprises at least one of: a gesture of the anchor being directed to the object, or a relative positional relationship between the anchor and the object being a target position relationship.

Based on any of the first to fourth examples of the second aspect, in an eighth example of the second aspect, the effect comprises at least one of: an image effect; a video effect; or an audio effect.

Based on the eighth example of the second aspect, in a ninth example of the second aspect, playing the effects in the live room comprises, in case that the effect is an image effect or a video effect: playing the effect around the object in the live room.

In a third aspect, one or more embodiments according to the present disclosure provide an electronic device, comprising: at least one processor and a memory; the memory storing computer-executable instructions; wherein the at least one processor executes the computer-executable instructions stored in the memory to cause the electronic device to perform the method according to any example of the first aspect.

In a fourth aspect, one or more embodiments according to the present disclosure provide a computer-readable storage medium having computer-executable instructions stored thereon which, when executed by a processor, cause the computing device to perform the method according to any example of the first aspect.

In a fifth aspect, one or more embodiments according to the present disclosure provide a computer program for implementing the method according to any example of the first aspect.

In a sixth aspect, one or more embodiments according to the present disclosure provide a computer program produce comprising computer programs, which computer programs, when executed by the processor, implement the method according to any example of the first aspect.

The above description only explains the preferred embodiments of the present disclosure and the technical principles applied. Those skilled in the art should understand that the scope of the present disclosure is not limited to the technical solution resulted from particular combinations of the above technical features, and meanwhile should also encompass other technical solutions formed from any combinations of the above technical features or equivalent features without deviating from the above disclosed inventive concept, such as the technical solutions formed by substituting the above features with the technical features disclosed here with similar functions.

Furthermore, although the respective operations are depicted in a particular order, it should be appreciated that the operations are not required to be completed in the particular order or in succession. In some cases, multitasking or multiprocessing is also beneficial. Likewise, although the above discussion comprises some particular implementation details, they should not be interpreted as limitations over the scope of the present disclosure. Some features described separately in the context of the embodiments of the description can also be integrated and implemented in a single embodiment. Conversely, all kinds of features described in the context of a single embodiment can also be separately implemented in multiple embodiments or any suitable sub-combinations.

Although the subject matter is already described by languages specific to structural features and/or method logic acts, it is to be appreciated that the subject matter defined in the attached claims is not limited to the above-described particular features or acts. On the contrary, the above-described particular features and acts are only example forms for implementing the claims.

We claim:

1. A method for playing an effect in a live room, the method comprising:
    identifying an object in the live room;
    determining an effect based on the object and a target attribute of the live room, wherein a relationship among the object, the target attribute and the effect is preset; and
    playing the effect in the live room, wherein the playing the effect in the live room further comprises:
    playing the effect in the live room in response to determining that a predetermined condition is satisfied, wherein the predetermined condition comprises at least one of:
        a number of times the effect was played in the live room during a predetermined time period being smaller than or equal to a preset threshold,
        a current time point being within a valid time duration of the effect, wherein the valid time duration indicates a time duration during which the effect is enabled to be played in the live room with the target attribute,
        a state of the object in the live room being a target object state,
        a state of an anchor in the live room being a target anchor state, or
        a duration of the object present in the live room being smaller than or equal to a preset duration threshold.

2. The method of claim 1, wherein the target attribute comprises at least one of an anchor attribute of the live room or a room attribute of the live room.

3. The method of claim 2, wherein the anchor attribute comprises at least one of an identification of the anchor, a name of the anchor, or a type of the anchor.

4. The method of claim 2, wherein the room attribute of the live room comprises at least one of an identification of the live room, a name of the live room or a type of the live room.

5. The method of claim 1, wherein the target object state comprises at least one of being at a handheld state or being located at a target position.

6. The method of claim 1, wherein the target anchor state comprises at least one of:
    a gesture of the anchor being directed to the object, or
    a relative positional relationship between the anchor and the object being a target position relationship.

7. The method of claim 1, wherein the effect comprises at least one of:
    an image effect;
    a video effect; or
    an audio effect.

8. The method of claim 1, wherein playing the effect in the live room comprises:
   playing the effect around the object in the live room in response to determining that the effect is an image effect or a video effect.

9. An electronic device comprising:
   at least one processor; and a memory storing computer-executable instructions; wherein the at least one processor is configured to execute the computer-executable instructions stored in the memory to cause the electronic device to perform operations comprising:
   identifying an object in a live room;
   determining an effect based on the object and a target attribute of the live room, wherein a relationship among the object, the target attribute and the effect is preset; and
   playing the effect in the live room, wherein the playing the effect in the live room further comprises:
   playing the effect in the live room in response to determining that a predetermined condition is satisfied, wherein the predetermined condition comprises at least one of:
      a number of times the effect was played in the live room during a predetermined time period being smaller than or equal to a preset threshold,
      a current time point being within a valid time duration of the effect, wherein the valid time duration indicates a time duration during which the effect is enabled to be played in the live room with the target attribute,
      a state of the object in the live room being a target object state,
      a state of an anchor in the live room being a target anchor state, or
      a duration of the object present in the live room being smaller than or equal to a preset duration threshold.

10. The electronic device of claim 9, wherein the target attribute comprises at least one of an anchor attribute of the live room or a room attribute of the live room.

11. The electronic device of claim 10, wherein the anchor attribute comprises at least one of an identification of the anchor, a name of the anchor, or a type of the anchor.

12. The electronic device of claim 9, wherein the room attribute of the live room comprises at least one of an identification of the live room, a name of the live room or a type of the live room.

13. The electronic device of claim 9, wherein the target object state comprises at least one of being at a handheld state or being located at a target position.

14. The electronic device of claim 9, wherein the target anchor state comprises at least one of:
   a gesture of the anchor being directed to the object, or
   a relative positional relationship between the anchor and the object being a target position relationship.

15. The electronic device of claim 9, wherein the effect comprises at least one of:
   an image effect;
   a video effect; or
   an audio effect.

16. The electronic device of claim 9, wherein the playing the effect in the live room comprises:
   playing the effect around the object in the live room in response to determining that the effect is an image effect or a video effect.

17. A non-transitory computer-readable storage medium having computer-executable instructions stored thereon which, when executed by a processor of a computing device, cause the computing device to perform operations comprising:
   identifying an object in a live room;
   determining a effect based on the object and a target attribute of the live room, wherein a relationship among the object, the target attribute and the effect is preset; and
   playing the effect in the live room, wherein the playing the effect in the live room further comprises:
   playing the effect in the live room in response to determining that a predetermined condition is satisfied, wherein the predetermined condition comprises at least one of:
      a number of times the effect was played in the live room during a predetermined time period being smaller than or equal to a preset threshold,
      a current time point being within a valid time duration of the effect, wherein the valid time duration indicates a time duration during which the effect is enabled to be played in the live room with the target attribute,
      a state of the object in the live room being a target object state,
      a state of an anchor in the live room being a target anchor state, or
      a duration of the object present in the live room being smaller than or equal to a preset duration threshold.

18. The non-transitory computer-readable storage medium of claim 17, wherein the target attribute comprises at least one of an anchor attribute of the live room or a room attribute of the live room.

* * * * *